(12) United States Patent
Shinkai et al.

(10) Patent No.: US 7,305,377 B2
(45) Date of Patent: Dec. 4, 2007

(54) INFORMATION PROCESSING APPARATUS FOR REPRODUCING METADATA AND METHOD, PROGRAM, AND RECORDING MEDIUM

(75) Inventors: Mitsutoshi Shinkai, Kanagawa (JP); Yoshiaki Shibata, Kanagawa (JP)

(73) Assignee: Sony Corporation, Tokyo (JP)

( * ) Notice: Subject to any disclaimer, the term of this patent is extended or adjusted under 35 U.S.C. 154(b) by 475 days.

(21) Appl. No.: 10/877,869

(22) Filed: Jun. 25, 2004

(65) Prior Publication Data

US 2004/0267698 A1 Dec. 30, 2004

(30) Foreign Application Priority Data

Jun. 26, 2003 (JP) ............... P2003-181999

(51) Int. Cl.
*G06F 7/00* (2006.01)
*G06F 17/30* (2006.01)

(52) U.S. Cl. ..................................... 707/1

(58) Field of Classification Search ............ 707/3, 707/104.1, 1; 725/135–136
See application file for complete search history.

(56) References Cited

U.S. PATENT DOCUMENTS 6,925,474 B2* 8/2005 McGrath et al. ......... 707/104.1
2003/0225753 A1* 12/2003 Balassanian et al. ........... 707/3
2004/0221322 A1* 11/2004 Shen et al. ................. 725/135

* cited by examiner

*Primary Examiner*—Jeffrey Gaffin
*Assistant Examiner*—Michael J Hicks
(74) *Attorney, Agent, or Firm*—Frommer Lawrence & Haug LLP; William S. Frommer

(57) ABSTRACT

An information processing apparatus for reproducing metadata including information on material data, the information processing apparatus determines whether or not the metadata inputted is defined in advance, and reproduces standard item data and non-standard item data included in the metadata when the metadata is defined in advance, and reproduces only the standard item data included in the metadata when the metadata is not defined in advance.

6 Claims, 13 Drawing Sheets

FIG. 7

```
<RealTimeMeta xmlns="urn:schemas-proDisc:realTimeMeta" ...>    1
  <TargetMaterial>060A...</TargetMaterial>                      2
  <Filler>00...</Filler>                                        3

<Frame>                                                       4
    <NextByteBoundary>0</NextByteBoundary>                      5
    <Ltc>...</Ltc>                                              6
    <Umid>...</Umid>                                            7
    <Klv>...</Klv>                                              8
    <Filler>00000000...</Filler>                                9
  </Frame>                                                     10

<Frame>
    <NextByteBoundary>0</NextByteBoundary>
    <Ltc>...</Ltc>
    <Umid>...</Umid>
    <Klv>...</Klv>
    <Filler>00000000...</Filler>
  </Frame>
  :
</RealTimeMeta>
```

Wrapper: lines 1–3
ESSENTIAL ITEMS: lines 4–10

FIG. 8

```
<RealTimeMeta xmlns="urn:schemas-proDisc:realTimeMeta:cameraMeta" ...>    1
  <TargetMaterial>060A...</TargetMaterial>                                 2
  <Filler>00...</Filler>                                                   3

<Frame>                                                                  4
    <NextByteBoundary>0</NextByteBoundary>                                 5
    <Ltc>...</Ltc>                                                         6
    <Umid>...</Umid>                                                       7
    <Klv>...</Klv>                                                         8
    <IrisF value="170"/>                                                   9
    <LensExtender value="3"/>                                             10
    <Zoom value="170"/>                                                   11
    <Focus value="170"/>                                                  12
    <ColorProperty>                                                       13
      <Red integral="2730" peak="2730"/>                                  14
      <Green integral="2730" peak="2730"/>                                15
      <Blue integral="2730" peak="2730"/>                                 16
    </ColorProperty>                                                      17
    <Filler>00000000...</Filler>                                          18
  </Frame>                                                                19
   :
</RealTimeMeta>
```

Wrapper: lines 1–3

ESSENTIAL ITEMS: lines 4–12

ORIGINAL ITEMS: lines 13–19

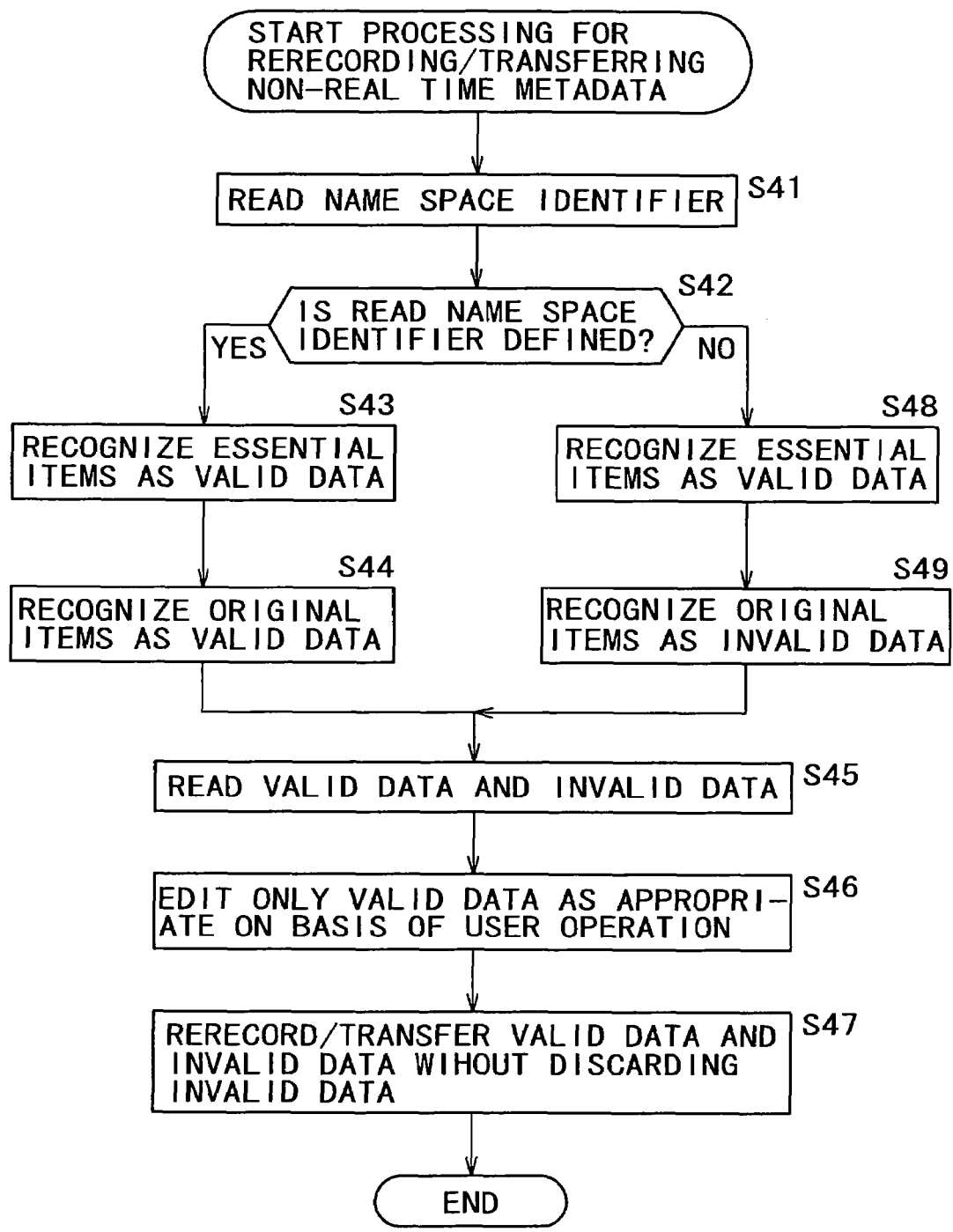

INFORMATION PROCESSING APPARATUS FOR REPRODUCING METADATA AND METHOD, PROGRAM, AND RECORDING MEDIUM

BACKGROUND OF THE INVENTION

The present invention relates to an apparatus and a method for information processing, a program, and a recording medium, and particularly to an apparatus and a method for information processing, a program, and a recording medium that make it possible to retrieve and edit image data and the like more easily.

Recently, use of metadata describing information on data of taken video material (the data will hereinafter be described also as material data) has been making progress in a field of production of video products such as TV programs, video contents and the like. Metadata is used to retrieve material data and edit the material data.

For effective use of metadata, compatibility of the metadata between a plurality of apparatus used in production of video products is required so that the metadata generated by a video signal recording apparatus such as a video camera, for example, can be used by a video signal reproducing apparatus such as an editing apparatus or the like.

Accordingly, standardization of a metadata description format has been under way in order to provide consistency in the description format and meanings of metadata. For example, MPEG (Moving Picture Experts Group) 7 has standardized a metadata description format by describing metadata using a highly versatile XML (extensible Markup Language).

However, even though metadata has been standardized, there is room left for each manufacturer to originally extend and describe metadata because concepts and objectives vary in practice among manufacturers that manufacture and sell video signal recording apparatus and video signal reproducing apparatus.

SUMMARY OF THE INVENTION

The present invention has been made in view of the above, and it is an object of the present invention to prevent trouble caused by metadata extended by another manufacturer independently while maintaining compatibility of the metadata.

According to the present invention, there is provided an information processing apparatus including: determining means for determining whether or not metadata inputted is defined in advance; and reproducing means for reproducing standard item data and non-standard item data included in the metadata when the determining means determines that the metadata is defined in advance, and reproducing only the standard item data included in the metadata when the determining means determines that the metadata is not defined in advance.

The metadata can be described using one of XML and BiM, which is a binary format of XML.

The determining means can determine whether or not the metadata is defined in advance on a basis of whether or not a name space identifier described in the metadata is defined in a schema possessed by the information processing apparatus.

The metadata can be real time metadata to be read simultaneously with reproduction of material data.

According to the present invention, there is provided an information processing method including: a determining step for determining whether or not metadata inputted is defined in advance; and a reproducing step for reproducing standard item data and non-standard item data included in the metadata when it is determined by processing of the determining step that the metadata is defined in advance, and reproducing only the standard item data included in the metadata when it is determined by the processing of the determining step that the metadata is not defined in advance.

According to the present invention, there is provided a program for making a computer execute a process including: a determining step for determining whether or not metadata inputted is defined in advance; and a reproducing step for reproducing standard item data and non-standard item data included in the metadata when it is determined by processing of the determining step that the metadata is defined in advance, and reproducing only the standard item data included in the metadata when it is determined by the processing of the determining step that the metadata is not defined in advance.

According to the present invention, there is provided a program on a recording medium, the program including: a determining step for determining whether or not metadata inputted is defined in advance; and a reproducing step for reproducing standard item data and non-standard item data included in the metadata when it is determined by processing of the determining step that the metadata is defined in advance, and reproducing only the standard item data included in the metadata when it is determined by the processing of the determining step that the metadata is not defined in advance.

The information processing apparatus and method, and the program according to the present invention reproduce standard item data and non-standard item data included in metadata when it is determined that the metadata inputted is defined in advance, and reproduce only the standard item data included in the metadata when it is determined that the metadata is not defined in advance.

According to the present invention, it is possible to retrieve and edit image data and the like more easily.

Further, according to the present invention, it is possible to prevent trouble caused by metadata extended by another manufacturer independently while maintaining compatibility of the metadata.

BRIEF DESCRIPTION OF THE DRAWINGS

FIG. 7 is a diagram showing an example of standard real time metadata described by XML before being encoded into a BiM;

FIG. 8 is a diagram showing an example of non-standard real time metadata described by XML before being encoded into a BiM;

FIG. 13 is a flowchart of assistance in explaining processing for rerecording/transferring non-real time metadata including original items.

DETAILED DESCRIPTION OF THE PREFERRED EMBODIMENT

A preferred embodiment of the present invention will hereinafter be described with reference to the drawings.

Figure 1:
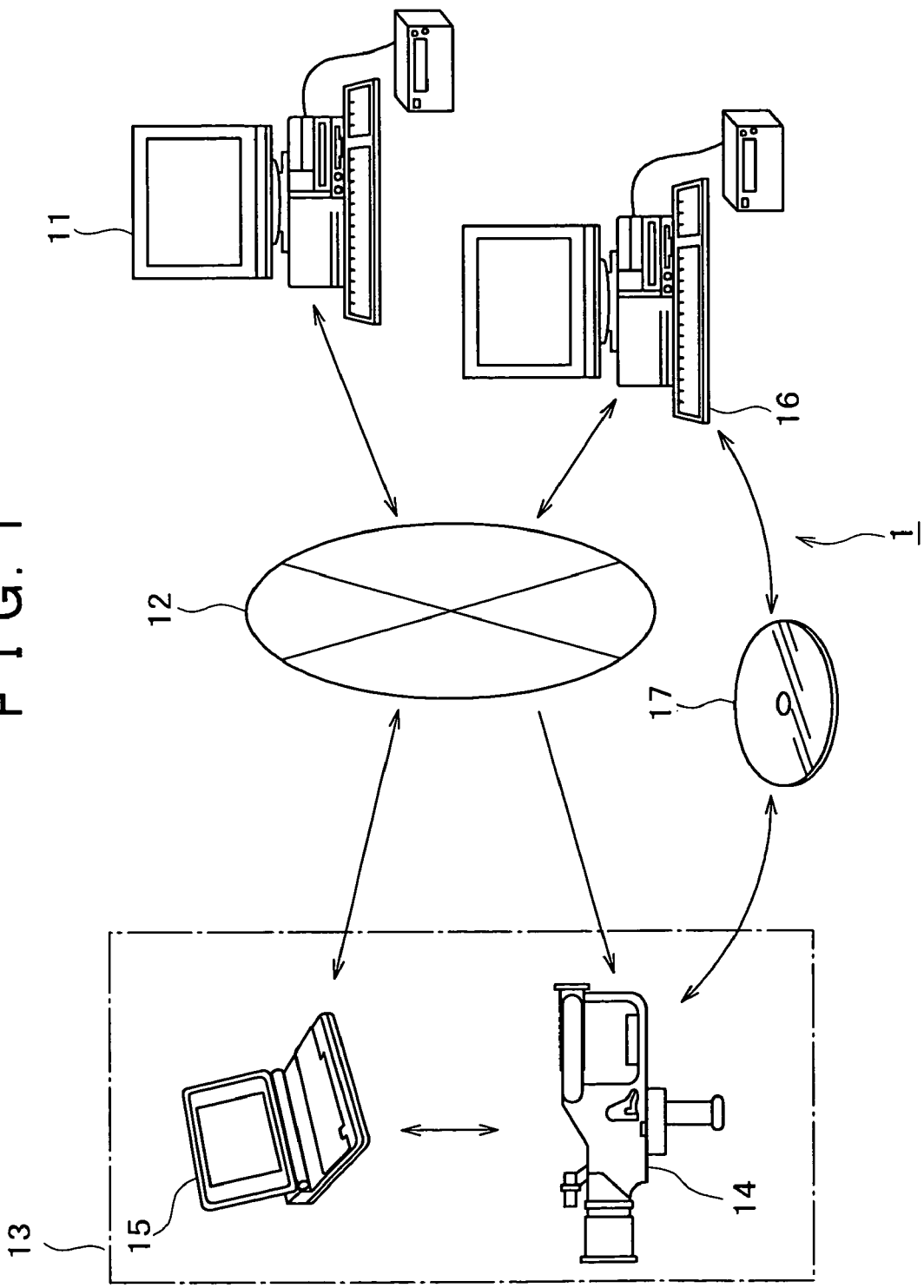
FIG. 1 is a diagram showing an example of configuration of a video program production support system to which the present invention is applied.

FIG. 1 shows an example of configuration of a video program production support system to which the present invention is applied. This video program production support system 1 is for example provided in a television broadcasting station that broadcasts a television signal or a company that produces video contents such as a video, a movie or the like, to produce a video program as a video product such as a television program, a movie or the like. The video program production support system 1 allows metadata formed in an electronic file format and added to the video program, and the like to be used consistently between a plurality of divisions sharing the production of the video program. The video program production support system 1 is thus intended to enable efficient production of video programs.

The video program production support system 1 includes: a planning terminal apparatus 11 for planning a video program; a network 12 connected with the planning terminal apparatus 11; a material collecting terminal apparatus 13 connected to the network 12, the material collecting terminal apparatus 13 including an image pickup device 14 and a field PC/PDA (Personal Computer/Personal Digital Assistant) 15 (hereinafter referred to as a field PC 15); an editing terminal apparatus 16 similarly connected to the network 12; and an optical disk 17 as a recording medium.

The planning terminal apparatus 11 for example includes an information processing apparatus such as a personal computer or the like and a peripheral device or the like. The planning terminal apparatus 11 is provided in a planning and organizing division or the like for planning video programs. The planning and organizing division oversees the entire production of the video programs. The planning and organizing division plans and designs a video program to be produced, creates a scenario (outline) for the video program, and instructs other divisions such as a material collecting division, an editing division and the like to be described later on production operations.

The planning terminal apparatus 11 performs processing such for example as generation for each video program of constructing table metadata in an electronic file format, the metadata including production instruction information and the like corresponding to a scenario for the video program. The planning terminal apparatus 11 supplies the generated constructing table metadata to the material collecting terminal apparatus 13 and the like via the network 12. The planning and organizing division instructs the material collecting division and the like on scenes and contents to be collected or taken.

The material collecting terminal apparatus 13 is a group of terminal apparatus used by the material collecting division for collecting material, and includes the image pickup device 14 and the field PC 15. The material collecting division actually collects material at a site of production according to production instructions and a scenario from the planning and organizing division, for example. The material collecting division takes a picture of each scene for constructing a video program and reports shooting conditions.

The image pickup device 14 includes a video camera such as a camcorder (registered trademark), for example. The image pickup device 14 is used to collect material for a news program to be broadcast or take a sports game or the like, video contents for a movie or the like. The image pickup device 14 is connected to the network 12 to obtain constructing table metadata from the planning terminal apparatus 11 via the network 12, for example. Then, the image pickup device 14 displays the obtained constructing table metadata on a predetermined display unit or the like to make a camera crew such as a camera operator and the like recognize contents to be taken. The image pickup device 14 takes each scene for constructing the video program on the basis of production instruction information in the constructing table metadata operated and obtained by the camera crew. Image data and audio data obtained by taking images are then recorded on a recording medium such as the optical disk 17.

The image pickup device 14 can record onto the optical disk 17 not only original image data as the image data obtained by taking images but also low resolution image data (hereinafter referred to as low resolution data), for example. The original image data, which is a large amount of data of high quality, is used for a finished product of the video program. On the other hand, the low resolution data is image data corresponding to frame pictures with a smaller number of pixels, which data is generated by discretely reducing a number of pixels of each frame from the original image data, for example. The low resolution data may be further encoded by an MPEG4 system, for example. The low resolution data, which is lower in picture quality but smaller in data amount than the original image data, imposes a light load on processing such as transmission, reproduction and the like, and is thus used mainly for rough edit processing and the like.

The optical disk 17 on which the image data, the audio data and the like are recorded by the image pickup device 14 is conveyed to the editing division to be described later, the field PC 15 or the like, for example, to be used by the editing division, the field PC 15 or the like. Since the conveyance of the optical disk 17 takes a certain time, the image pickup device 14 may be able to supply the video contents to the planning terminal apparatus 11, the field PC 15, the editing terminal apparatus 16 or the like via the network 12. In this case, it is desirable that the image pickup device 14 supply the low resolution data small in data amount which data corresponds to the image data obtained by image pickup in order to reduce transfer time (in order to reduce a load on transfer processing).

Incidentally, the image pickup device 14 may transfer the low resolution data in any timing; the image pickup device 14 may transfer the low resolution data in parallel with image pickup processing, or the image pickup device 14 may transfer the low resolution data en bloc after an end of image pickup processing.

Thus, transferring the low resolution data prior to the conveyance of the optical disk 17 enables the editing division to perform editing operation in a relatively early stage (in parallel with image pickup processing, for example) even when the conveyed optical disk 17 has not arrived. It is therefore possible to enhance efficiency of production of video programs. Incidentally, when the low resolution data is transmitted via the network 12 as described above, the image pickup device 14 may record only the original image data and the audio data onto the optical disk 17, for example (the image pickup device 14 does not need to record the low resolution data onto the optical disk 17).

It is to be noted that the recording medium on which video contents and the like are recorded by the image pickup device 14 is not limited to the above-described example of the optical disk 17, and may be any recording medium. For example, the recording medium may be a magnetic disk including a flexible disk, a magnetic tape used in DV (Digital Video) or VHS (Video Home System), a semiconductor memory including a flash memory, or the like.

The field PC 15 for example includes a portable information processing apparatus such as a notebook personal computer, a PDA or the like and a peripheral device and the like. The field PC 15 is connected to the image pickup device 14 by various wire or radio lines or the like so that the field PC 15 can share for example constructing table metadata, video contents and the like with the image pickup device 14.

The field PC 15 for example obtains the constructing table metadata from the planning terminal apparatus 11 via the network 12, or obtains the constructing table metadata from the image pickup device 14. The field PC 15 displays the obtained constructing table metadata on a predetermined display unit to make a person in charge from the material collecting division recognize contents to be collected or taken.

Further, the field PC 15 generates shooting condition information, which is information on material-collecting and shooting conditions, on the basis of input of the person in charge from the material collecting division as a user, and adds the generated shooting condition information in an appropriate section within the constructing table metadata. This shooting condition information is text data or the like entered from various viewpoints for each take or at each material-collecting site, for example, and is useful at a time of edit processing in a later stage. The field PC 15 thus edits the constructing table metadata by writing the shooting condition information. The field PC 15 also supplies the shooting condition information as metadata to the image pickup device 14 to add the shooting condition information to the image data and the audio data obtained in the image pickup device 14.

The editing terminal apparatus 16 for example includes an information processing apparatus such as a personal computer or the like and a peripheral device. The editing terminal apparatus 16 is provided in the editing division for editing video contents. The editing division edits the image data and the audio data obtained by the image pickup device 14 on the basis of the production instructions and the scenario from the planning and organizing division, the constructing table metadata reflecting conditions in material collection by the material collecting division, and the like, and thereby completes the video program.

The editing terminal apparatus 16 obtains the updated constructing table metadata and the low resolution data from the image pickup device 14 via the network 12, for example. In addition, the editing terminal apparatus 16 reproduces the original image data and the audio data from the optical disk 17 on which the image data and the audio data are recorded by the image pickup device 14. Further, the editing terminal apparatus 16 can obtain the production instructions directly from the planning terminal apparatus 11 via the network 12.

The editing terminal apparatus 16 suitably reproduces and displays the obtained video contents data on the basis of the constructing table metadata obtained as described above. For example, the editing terminal apparatus 16 continuously displays the low resolution data operated by the user and obtained via the network 12, or the original image data and the audio data recorded on the optical disk 17 in an order according to the scenario, or displays only image data of a desired clip. Incidentally, when reproducing the original image data recorded on the optical disk 17, the editing terminal apparatus 16 uses a disk device or the like as a recording and reproducing device for reading data recorded on the optical disk 17 and writing data to the optical disk 17, for example.

The editing terminal apparatus 16 not only reproduces and displays necessary image data and the like in a suitable order on the basis of the constructing table metadata, but also performs processing for editing the image data and the like obtained by collecting materials, for example. This edit processing includes rough edit processing and main edit processing.

Rough edit processing is simple edit processing on image data and audio data. For example, in rough edit processing, when the editing terminal apparatus 16 obtains a plurality of pieces of data (hereinafter referred to as clip data) on video contents including image data, audio data and the like corresponding to a clip as a unit representing one image pickup process, for example, the editing terminal apparatus 16 selects clip data to be used in a main edit from these pieces of clip data. The editing terminal apparatus 16 further selects a necessary video portion from the selected clip data (logging), and sets an edit start position (In point) and an edit end position (Out point) corresponding to the selected video portion by using for example a time code or the like. The editing terminal apparatus 16 thereby extracts the corresponding portion from the above-described clip data (ingesting).

Incidentally, the clip is a unit that not only represents one image pickup process but also indicates a time from a start of image pickup in the image pickup process to an end of the image pickup, a length of various data obtained by the image pickup process, and a data amount of the various data obtained by the image pickup process. Further, the clip can represent an aggregate itself of the various data.

Main edit processing connects together pieces of clip data after being subjected to rough edit processing, performs final picture quality adjustment and the like on the image data, and thus generates completed package data as data for broadcasting in a program or the like.

Incidentally, each of the planning terminal apparatus 11, the image pickup device 14, the field PC 15, the editing terminal apparatus 16 and the like described above may be formed by a plurality of apparatus. For example, one editing terminal apparatus 16 may obtain image data and the like obtained in a plurality of image pickup devices 14 via the optical disk 17 or the network 12 to perform edit processing on the data, or a plurality of editing terminal apparatus 16 may edit data supplied from one image pickup device 14.

While each of the planning terminal apparatus 11, the image pickup device 14, the field PC 15, the editing terminal apparatus 16 and the like described above is formed as a separate unit, the present invention is not limited to this, and a part or all of functions of the apparatus may be integrated with each other.

In addition, for example a center server (not shown) connected to the network 12 may be provided in the video program production support system 1 separately from the planning terminal apparatus 11, the image pickup device 14, the field PC 15, and the editing terminal apparatus 16 described above, so that a client/server system may be formed with the planning terminal apparatus 11, the image pickup device 14, the field PC 15, the editing terminal apparatus 16 and the like as clients.

Figure 2:
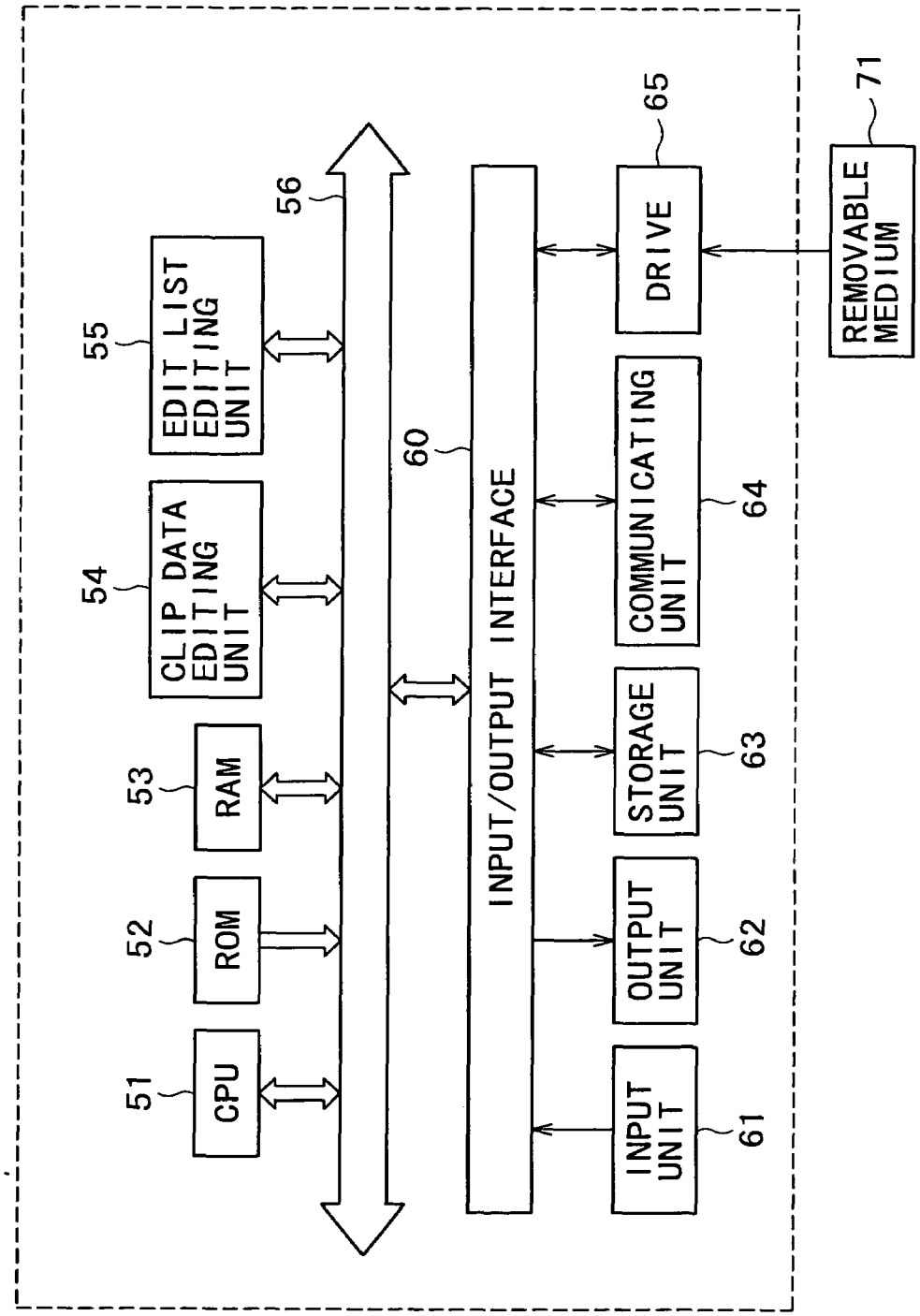
FIG. 2 is a block diagram showing an example of internal configuration of an editing terminal apparatus in FIG. 1.

FIG. 2 shows a detailed example of configuration of the editing terminal apparatus 16 in FIG. 1. A CPU (Central Processing Unit) 51 in the editing terminal apparatus 16 performs various processing according to a program stored in a ROM (Read Only Memory) 52. A RAM (Random Access Memory) 53 stores data, a program and the like necessary for the CPU 51 to perform various processing, as required.

A clip data editing unit 54 controls an output unit 62 to display a GUI (Graphical User Interface) or the like on a display or the like. The clip data editing unit 54 performs edit processing on the image data, the audio data, the low resolution data, the metadata or the like recorded on the optical disk 17 loaded in a drive 65, or the low resolution data or the like obtained via a communicating unit 64 on the basis of operating input from the user which input is received by an input unit 61. The clip data editing unit 54 generates information on edit contents, information on data after the edit, and the like, and then supplies the information to an edit list editing unit 55. Incidentally, the clip data editing unit 54 performs nondestructive edit processing without updating the various data to be edited.

The edit list editing unit 55 generates an edit list as information on an edit result on the basis of the various information generated in association with the edit processing performed in the clip data editing unit 54, and then stores the edit list in a storage unit 63. At this time, as later described, the edit list editing unit 55 generates edit list clip metadata as clip metadata for the edit list on the basis of clip metadata of a clip being edited, of which metadata real time performance is not required. For example, on the basis of a conversion table included in clip metadata of a clip being edited, the edit list editing unit 55 generates a conversion table of a discontinuity point of an LTC (Linear Time Code) corresponding to image data and the like of the clip after the edit and a frame number thereof, and then records the conversion table as edit list clip metadata.

The CPU 51, the ROM 52, the RAM 53, the clip data editing unit 54, and the edit list editing unit 55 are interconnected via a bus 56. The bus 56 is also connected with an input/output interface 60.

The input/output interface 60 is connected with the input unit 61 including a keyboard and a mouse for outputting a signal inputted to the input unit 61 to the CPU 51. The input/output interface 60 is also connected with the output unit 62 including a display, a speaker and the like.

Further, the input/output interface 60 is connected with the storage unit 63 including a hard disk, an EEPROM (Electronically Erasable and Programmable Read Only Memory) and the like, as well as the communicating unit 64 for communicating data with another apparatus via the network 12 or the like. The drive 65 is used to read and write data from and to a removable medium 71 including a recording medium such as a magnetic disk, an optical disk, a magneto-optical disk, a semiconductor memory or the like.

Description will next be made of the optical disk 17 and an example of structure of data recorded on the optical disk 17 used in edit processing by such an editing terminal apparatus 16.

As the optical disk 17, various optical disks and the like can be used, such for example as DVD-RAM (Digital Versatile Disc-Random Access Memory), DVD-R (DVD-Recordable), DVD-RW (DVD-ReWritable), DVD+R (DVD+Recordable), DVD+RW (DVD+ReWritable), CD-R (Compact Disc-Recordable), CD-RW (CD-ReWritable), or MD (Mini Disc) (registered trademark).

Figure 3:
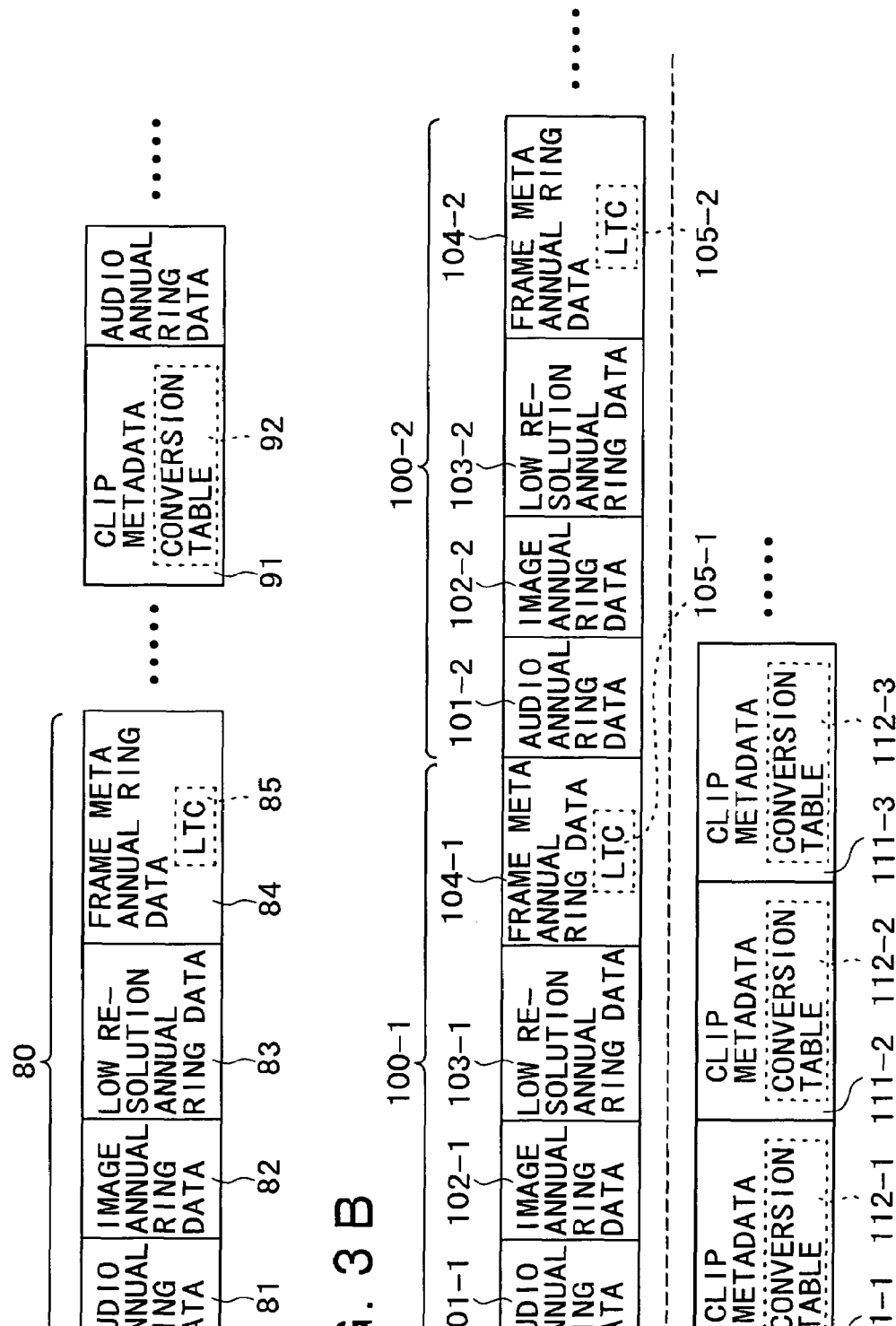
FIGS. 3A and 3B are schematic diagrams showing examples of structure of data recorded on an optical disk in FIG. 1.

As described above, the image pickup device 14 records a plurality of pieces of clip data including image data, audio data and the like on the optical disk 17 as a recording medium as shown in FIG. 3A, for example.

In FIG. 3A, annual ring data 80 including audio annual ring data 81, video annual ring data 82, low resolution annual ring data 83, and frame meta annual ring data 84 corresponding to a predetermined time unit (for example two seconds) obtained by the image pickup device 14 is recorded continuously for one clip on the optical disk 17. Clip metadata 91 corresponding to the clip is recorded following last annual ring data 80. Further, annual ring data and clip metadata corresponding to another clip and the like are subsequently recorded.

The audio annual ring data 81 and the video annual ring data 82 have the same reproduction time and correspond to each other. That is, the audio annual ring data 81 is audio data corresponding to moving pictures obtained by reproducing the video annual ring data 82. The low resolution annual ring data 83 corresponds to the video annual ring data 82, and has the same reproduction time as the video annual ring data 82. That is, the low resolution annual ring data 83 corresponds to moving pictures of a small picture size resulting from reduction of picture size of the moving pictures obtained by reproducing the video annual ring data 82. The frame meta annual ring data 84 includes metadata (hereinafter referred to as frame metadata) added to each frame (image data for one screen) of the moving pictures corresponding to the video annual ring data 82. That is, the frame meta annual ring data includes a plurality of pieces of frame metadata corresponding to all frames of the video annual ring data 82.

Incidentally, frame metadata is data corresponding to a frame to which the frame metadata is added, and is data of which real time performance is required at a time of reproduction of a video signal and the like (real time metadata). That is, the frame metadata for example includes an LTC as a time code for distinguishing a video signal corresponding to the frame by predetermined time information such as a date and time (year, month, day, hour, minute, and second), a user bit (UB) indicating a signal characteristic of the video signal of the frame, a UMID, GPS (Global Positioning System) information indicating a position where image pickup by the video camera was performed, an essence mark as information on contents of essence data such as the video signal, audio signal and the like, ARIB (Association of Radio Industries and Businesses) metadata, and setting/control information of the video camera that performed the image pickup.

The ARIB metadata is standardized by the ARIB, and is superimposed on a standard communication interface such as SDI (Serial Digital Interface) or the like. The setting/control information of the video camera is for example an IRIS control value, a white balance/black balance mode, lens information on a zoom, focus and the like of the lens, and the like.

The frame meta annual ring data 84 thus includes a real time and an LTC 85 as frame time information using a time independent from the real time referring to a predetermined time. The LTC 85 is a set of LTCs added to respective frames. The LTC 85 includes LTCs corresponding to all the frames of the video annual ring data 82 included in the same annual ring data 80. At a time of reproduction of the audio annual ring data 81 and the video annual ring data 82, the LTC 85 is reproduced together with the audio annual ring data 81 and the video annual ring data 82.

Data is recorded on the optical disk 17 in a form of a spiral or a concentric circle from an inner circumference side to an outer circumference side of the optical disk 17. Thus, annual ring data 80 including audio data 81 and image data 82 corresponding to the same reproduction time, and low resolution data 83 and frame metadata 84 corresponding to the audio data 81 and the image data 82 is recorded on the optical disk 17 in order in which the data is obtained by image pickup, whereby the pieces of data corresponding to each other are recorded (arranged) at positions physically adjacent to each other on the optical disk 17. The optical disk 17 thus makes it possible to reduce seek time and reduce processing time and a load necessary in processing at a time of data reproduction (at a time of reading processing).

Following a plurality of pieces of annual ring data 80 thus recorded for one clip, clip metadata 91 is recorded.

The clip metadata 91 corresponds to the whole of the added clip, and is data of which real time performance is not required at a time of reproduction of a video signal or the like (hereinafter referred to also as non-real time metadata). The clip metadata for example includes a conversion table 92 for associating an LTC corresponding to each frame with a frame number, a UMID, GPS information, and other information. The clip metadata 91 is mainly used at a time of editing audio data and image data or at a time of search, for example. The clip metadata 91 therefore includes data of types not required at a time of reproduction of image data and the like.

Incidentally, the frame metadata and the clip metadata may include data other than that described above. Also, the frame metadata and the clip metadata may include data of the same contents, the above-described pieces of data as the frame metadata may be used as the clip metadata, or conversely the above-described pieces of data as the clip metadata may be used as the frame metadata.

For example, the essence mark, the ARIB metadata, the setting/control information of the video camera, or the like may be used as clip metadata, or may be included in both the frame metadata and the clip metadata. Also, the UMID, the GPS information or the like may be included in the frame metadata, or may be included in both the frame metadata and the clip metadata.

The conversion table 92 included in the clip metadata 91 in FIG. 3A is a table corresponding to LTCs included in annual ring data extending from first annual ring data, or annual ring data recorded next to clip metadata recorded immediately preceding the clip metadata 91, to annual ring data recorded immediately before the clip metadata 91. The conversion table 92 is therefore recorded somewhat close (as compared with a case of FIG. 3B to be described later) to the audio annual ring data 81 and the video annual ring data 82 to which the conversion table 92 corresponds.

Basically real time performance is not required of metadata included in the clip metadata 91. However, when a user uses the conversion table 92 to give an instruction for reproduction of a specific frame, for example, it is preferable that the audio annual ring data 81 and the video annual ring data 82 to be reproduced be recorded close to the conversion table 92, because it can reduce seek time and increase speed at which the audio annual ring data 81 and the video annual ring data 82 are read.

Incidentally, clip metadata may be recorded together in an area different from an area for storing annual ring data, as shown in FIG. 3B, for example. In the case of FIG. 3B, clip metadata such as clip metadata 111-1, clip metadata 111-2, and clip metadata 111-3 is recorded together in an area different from an area for recording annual ring data such as annual ring data 100-1 including audio annual ring data 101-1, video annual ring data 102-1, low resolution annual ring data 103-1, and frame meta annual ring data 104-1, and annual ring data 100-2 including audio annual ring data 101-2, video annual ring data 102-2, low resolution annual ring data 103-2, and frame meta annual ring data 104-2.

Each of the pieces of clip metadata 111-1 to 111-3 includes one of conversion tables 92-1 to 92-3. These conversion tables 112-1 to 112-3 have registered therein a start point, a change point, and an end point (that is, a frame at which an LTC value is discontinuous with an LTC value of an immediately preceding frame (or an immediately succeeding frame)) of LTC included in corresponding frame meta annual ring data.

It is to be noted that the conversion tables 112-1 to 112-3 are not limited to this, and LTC may be registered at predetermined intervals, for example. The larger the number of LTCs registered in a conversion table is, the more the time for calculating a frame number of a requested frame can be reduced at a time of frame retrieval. However, increase in data size of the conversion table may lengthen a total retrieval processing time. It is therefore desirable to select LTCs used for the conversion tables such that the conversion tables are of appropriate size.

In this case, the clip metadata is recorded in the area different from that of the annual ring data after an audio data recording task, a image data recording task, a low resolution data recording task, and a frame metadata recording task are finished.

Thus, the conversion tables 112-1 to 112-3 included in the clip metadata 111-1 to 111-3, respectively, are recorded in proximity to each other. Hence, when a specific frame is retrieved using the plurality of conversion tables, seek time can be reduced and the target frame can be retrieved quickly.

In addition, when the audio data and the image data are reproduced, since the clip metadata unnecessary for the reproduction is not present between these pieces of data, it is possible to reduce reading time and increase speed of reproduction processing.

Further, the clip metadata includes metadata of which real time performance is not required, and normally the clip metadata does not require seek time to be taken into consideration. Therefore the clip metadata may be disposed at any physical position in a storage area of the optical disk 17; for example, one piece of clip metadata may be recorded in a distributed manner at a plurality of positions.

As described above, LTC is recorded as frame metadata together with essence data such as image data, audio data and the like, and conversion tables including a start point, a change point, and an end point of the LTC and the like are recorded as clip metadata. Thus, when editing data recorded on the optical disk 17 described above, a user can perform edit processing easily on the basis of the LTC, and also retrieve and reproduce a target frame on the basis of the LTC.

Description will next be made of a file system for managing the data recorded on the optical disk 17, and a directory structure and files in the file system.

Any file system may be used as the file system for managing the data recorded on the optical disk 17. For example, UDF (Universal Disk Format), ISO 9660 (International Organization for Standardization 9660) or the like may be used. When a magnetic disk such as a hard disk is used in place of the optical disk 17, FAT (File Allocation Tables), NTFS (New Technology File System), HFS (Hierarchical File System), UFS (Unix (registered trademark) File System) or the like may be used as the file system. Alternatively, a special file system may be used.

Figure 4:
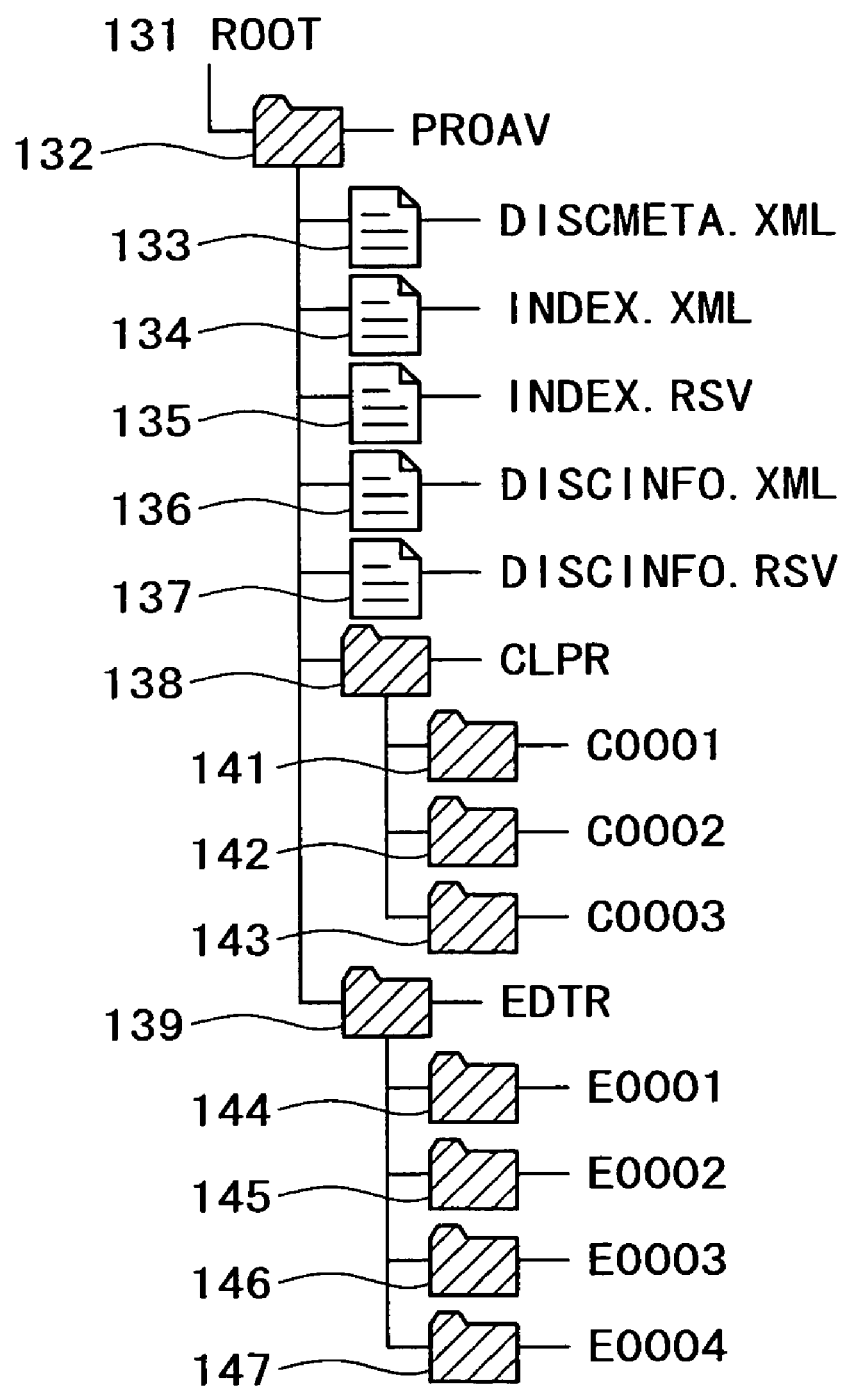
FIG. 4 is a diagram showing an example of a directory structure for managing data by a file system.

In this file system, the data recorded on the optical disk 17 is managed by a directory structure and files as shown in FIG. 4.

A root directory (ROOT) 131 in FIG. 4 has a PROAV directory 132 including subdirectories in which information on essence data such as image data, audio data and the like, edit lists representing results of editing the essence data, and the like are disposed. Though not shown, constructing table data and the like are disposed in the root directory 131.

The PROAV directory 132 includes: a disk metafile (DISCMETA.XML) 133 as a file including information such for example as a title and comments for all the essence data recorded on the optical disk 17 and a path to image data corresponding to a representative picture as a frame representative of all the image data recorded on the optical disk 17; and an index file (INDEX.XML) 134 and an index file (INDEX.RSV) 135 including for example managing information for managing all clips and edit lists recorded on the optical disk 17. Incidentally, the index file 135 is a reproduction of the index file 134. The two files are provided to improve reliability.

The PROAV directory 132 includes a disk information file (DISCINFO.XML) 136 and a disk information file (DISCINFO.RSV) 137, which are metadata for the entire data recorded on the optical disk 17 and a file including information such as disk attributes, a reproduction start position, or Reclnhi, for example. Incidentally, the disk information file 137 is a reproduction of the disk information file 136. The two files are provided to improve reliability. However, when the information is updated, only the disk information file 136 may be updated.

In addition to the files described above, the PROAV directory 132 further includes a clip root directory (CLPR) 138 having clip data disposed in subdirectories and an edit list root directory (EDTR) 139 having edit list data disposed in subdirectories.

In the clip root directory 138, the clip data recorded on the optical disk 17 is managed in different, separate directories one for each clip. In the case of FIG. 4, for example, three pieces of clip data are managed in three separate directories, that is, a clip directory (C001) 141, a clip directory (C0002) 142, and a clip directory (C0003) 143.

Specifically, data of a first clip recorded on the optical disk 17 is managed as files in a subdirectory of the clip directory 141; data of a second clip recorded on the optical disk 17 is managed as files in a subdirectory of the clip directory 142; and data of a third clip recorded on the optical disk 17 is managed as files in a subdirectory of the clip directory 143.

In the edit list root directory 139, the edit lists recorded on the optical disk 17 are managed in different, separate directories one for each edit process. In the case of FIG. 4, for example, four edit lists are managed in four separate directories, that is, an edit list directory (E0001) 144, an edit list directory (E0002) 145, an edit list directory (E0003) 146, and an edit list directory (E0004) 147.

Specifically, the edit list representing a result of first editing of the clips recorded on the optical disk 17 is managed as files in a subdirectory of the edit list directory 144; the edit list representing a result of second editing is managed as files in a subdirectory of the edit list directory 145; the edit list representing a result of third editing is managed as files in a subdirectory of the edit list directory 146; and the edit list representing a result of fourth editing is managed as files in a subdirectory of the edit list directory 147.

Figure 5:
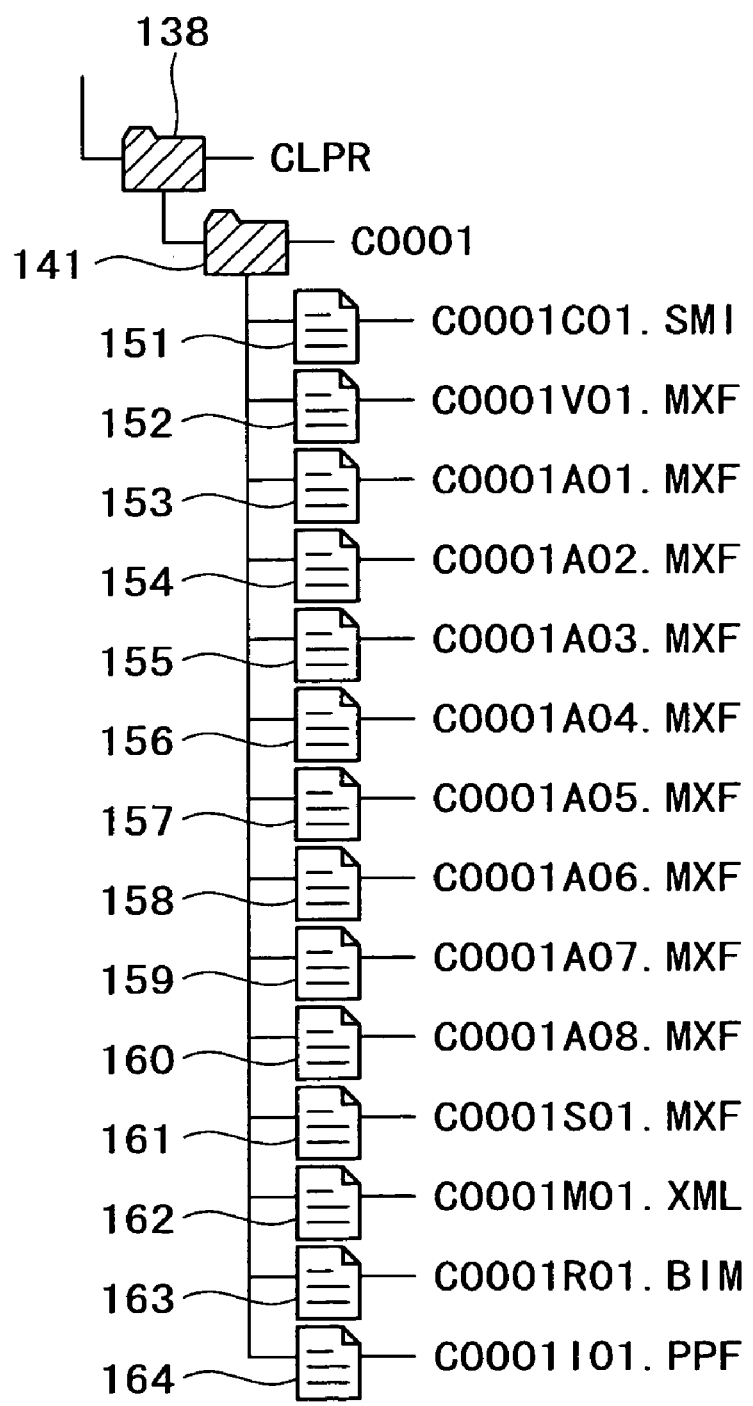
FIG. 5 is a diagram showing a more detailed example of the directory structure in FIG. 4.

In the subdirectory of the clip directory 141 provided in the above-described clip root directory 138, the data of the first clip recorded on the optical disk 17 is provided and managed as files as shown in FIG. 5.

In the case of FIG. 5, the clip directory 141 includes: a clip information file (C0001C01.SMI) 151 for managing this clip; a image data file (C0001V01.MXF) 152 including image data of the clip; eight audio data files (C0001A01.MXF to C0001A08.MXF) 153 to 160 including audio data of channels of the clip; a low resolution data file (C0001SO1.MXF) 161 including low resolution data corresponding to the image data of the clip; and a clip metadata file (C0001M01.XML) 162 corresponding to the essence data of the clip and including clip metadata, which is metadata such as a conversion table for associating LTC with frame numbers, for example, of which metadata real time performance is not required.

The clip directory 141 further includes: a frame metadata file (C0001R01.BIM) 163 corresponding to the essence data of the clip and including frame metadata, which is metadata such as the LTC, for example, of which metadata the real time capability is required; and a picture pointer file (C0001I01.PPF) 164 for describing frame structure of the image data file 152 (for example information on a compression form of each picture in MPEG or the like, and information on an offset address from a start of the file and the like).

In the case of FIG. 5, the image data, the low resolution data, and the frame metadata, of which data the real time capability is required at a time of reproduction, are each managed as one file so as not to increase reading time.

While the real time capability is required also of the audio data at a time of reproduction, eight channels are provided to support multiple audio channels such as 7.1 channels or the like, and are managed as different files, respectively. That is, the audio data is managed as eight files in the above description; however, the present invention is not limited to this, and a number of files corresponding to the audio data may be 7 or less, or 9 or more.

Similarly, the image data, the low resolution data, and the frame metadata may be each managed as two or more files in some cases.

In FIG. 5, the clip metadata of which the real time capability is not required is managed as a file different from that of the frame metadata of which the real time capability is required. This is to prevent reading of the metadata that is not required during normal reproduction of the image data and the like. It is thereby possible to reduce processing time of reproduction processing and a load necessary in the processing.

Incidentally, while the clip metadata file 162 is described in an XML (extensible Markup Language) format for versatility, the frame metadata file 163 is in a BiM format in which the data described by XML is encoded in a binary format, in order to reduce the processing time of the reproduction processing and the load necessary in the processing.

Incidentally, the BiM encoded in the binary format, such as the frame metadata file (C0001R01.BIM) 163, will be described later with reference to FIG. 7 and subsequent figures.

The example of structure of the files in the clip directory 141 shown in FIG. 5 is applicable in all clip directories corresponding to each clip recorded on the optical disk 17. Specifically, the example of structure of the files shown in FIG. 5 is applicable in the other clip directories 142 and 143 shown in FIG. 4. Therefore description of the clip directories 142 and 143 will be omitted.

While the files included in a clip directory corresponding to one clip have been described above, the structure of the files is not limited to the above example, and may be any structure as long as a clip metadata file corresponding to the clip is present in a subdirectory of the clip directory.

Description will next be made of an example of structure of files in a subdirectory of the edit list root directory 139 in FIG. 4. In the subdirectory of the edit list directory 145 provided in the above-described edit list root directory 139, edit list data as information on the result of the second editing of the clip data recorded on the optical disk 17 is provided and managed as files as shown in FIG. 6.

Figure 6:
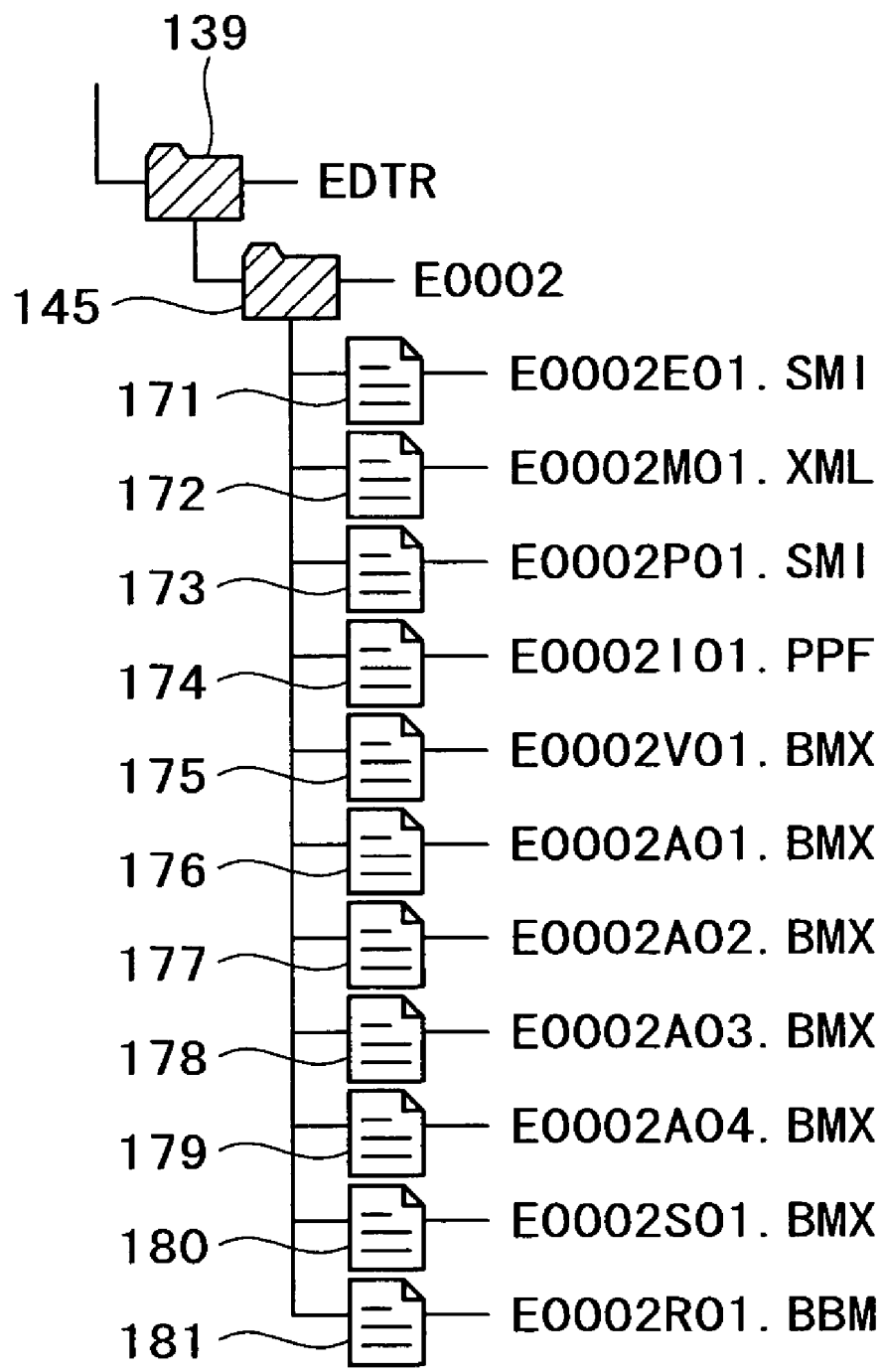
FIG. 6 is a diagram showing a more detailed example of the directory structure in FIG. 4.

In the case of FIG. 6, the edit list directory 145 includes: an edit list file (E0002E01.SMI) 171 for managing this edit result (edit list); an edit list clip metadata file (E0002M01.XML) 172 including clip metadata corresponding to essence data after this edit (parts extracted as data after the edit from the essence data of all clips used in the edit), or clip metadata newly generated on the basis of the clip metadata; a play list file (E0002P01.SMI) 173 including information such for example as a reproduction procedure (play list) of the essence data on the basis of this edit result (edit list); and a play list picture pointer file (E0002I01.PPF) 174 for describing frame structure of image data reproduced on the basis of the reproduction procedure included in the play list file 173 (for example information on a compression form of each picture in MPEG or the like, and information on an offset address from a start of the file and the like).

The edit list directory 145 further includes: a play list image data file (E0002V01.BMX) 175 including image data for-ensuring real time reproduction based on the reproduction procedure (play list) of the play list file 173; four play list audio data files (E0002A01.BMX to E0002A04.BMX) 176 to 179 including audio data for ensuring real time reproduction based on the reproduction procedure (play list) of the play list file 173; a play list low resolution data file (E0002S01.BMX) 180 including low resolution data for ensuring real time reproduction based on the reproduction procedure (play list) of the play list file 173; and a play list frame metadata file (E0002R01.BBM) 181 including frame metadata for ensuring real time reproduction based on the reproduction procedure (play list) of the play list file 173.

In FIG. 6, the clip metadata of which the real time capability is not required is managed as a file different from that of the frame metadata of which the real time capability is required. This is to prevent reading of the metadata that is not required during reproduction of the image data and the like using the reproduction procedure (play list) (during reproduction of the edit result). It is thereby possible to reduce processing time of reproduction processing and a load necessary in the processing.

The edit list clip metadata file 172 includes new clip metadata generated on the basis of clip metadata (clip metadata files present in the subdirectories of the clip root directory 138) of the clips used in the edit and on the basis of the edit result. For example, when the edit is performed, parts corresponding to the essence data after the edit are extracted from the clip metadata included in the clip metadata file 162 in FIG. 5, and these parts are used to reconstruct new clip metadata with the essence data after the edit as one clip and manage the clip metadata as the edit list clip metadata file.

That is, the new clip metadata for the essence data after the edit as one clip is added to the essence data after the edit. The clip metadata is managed as one edit list clip metadata file. Thus, the edit list clip metadata file is generated for each edit.

Incidentally, the edit list clip metadata file 172 is described in the XML format for versatility.

The image data included in the play list image data file 175, the audio data included in the play list audio data files 176 to 179, the low resolution data included in the play list low resolution data file 180, and the frame metadata included in the play list frame metadata file 181 are extracted from the image data, the audio data, the low resolution data, and the frame metadata, respectively, corresponding to the clips managed in the subdirectories of the clip root directory 138 in FIG. 5, and correspond to the edit result.

These pieces of data are read when reproduction processing is performed on the basis of the reproduction procedure (play list) included in the play list file 173. The provision of the pieces of data corresponding to the edit result makes it possible to reduce a number of files to be read in reproduction processing based on the play list and reduce time of the processing and a load necessary in the processing.

Incidentally, each of the image data, the low resolution data, and the frame metadata may be managed as a plurality of files in some cases. Also, a number of files corresponding to the audio data may be three or less, or five or more.

The play list frame metadata file 181 is in a BBM format corresponding to the BIM format obtained by compiling a file in the XML format in order to reduce the processing time of reproduction processing and a load necessary in the processing.

The example of structure of the files in the edit list directory 145 shown in FIG. 6 is applicable in all the edit lists (edit results). Specifically, the example of structure of the files shown in FIG. 6 is applicable in the other edit list directory 144, 146, or 147 shown in FIG. 4. Therefore description of the edit list directories 144, 146, and 147 will be omitted.

While the files included in an edit list directory corresponding to one editing operation have been described above, the structure of the files is not limited to the above example, and may be any structure as long as an edit list clip metadata file corresponding to the editing is present in a subdirectory of the edit list directory.

Description will next be made of data included in clip metadata. As described above, the clip metadata includes a conversion table of LTC and frame numbers, a UMID, GPS information, and other information. These pieces of information are standardized information that may be stored in frame metadata, and are KLV (Key Length Value)-encoded data (hereinafter referred to as KLV data) including key data, length data, and value data in order to ensure communication of a synchronizing system using a standard interface such as an SDI (Serial Digital Interface) or the like because real time performance may be required. This format complies with SMPTE 336M.

The key data of the KLV data is an identifier indicating a KLV-encoded data item. Identifiers corresponding to various data items defined in an SMPTE metadata dictionary are used as the identifier. The length data of the KLV data indicates length of the value data in bytes. The value data of the KLV data includes data proper such as text data as in XML documents or the like. That is, the KLV data is obtained by encoding the data of the data item indicated by the key data, the data of the data length indicated by the length data, and the data represented by the value data.

Thus, the conversion table and the UMID are actually part of the KLV data; however, for simplicity of description, metadata (KLV data) other than the conversion table and the UMID included in the clip metadata will be referred to as KLV data.

It is to be noted that the above-described encoding method is an example, and that each piece of information included in the clip metadata may be encoded by a method other than the KLV encoding method, or may be uncoded.

Description will next be made of a BiM compression-coded in a binary format, such as the frame metadata file (C0001R01.BIM) 163 shown in FIG. 5. A BiM encoder is required to compression-code metadata described by XML and thereby generate a BiM, while a BiM decoder is required to decode the BiM and interpret contents thereof. The editing terminal apparatus 16 has a BiM encoder and a BiM decoder included in the clip data editing unit 54.

The BiM encoder has a schema definition document in which a system for describing metadata as a source of a BiM is defined. The BiM decoder also has the schema definition document in which the system for describing the metadata as the source of the BiM is defined. When the BiM encoder and the BiM decoder have the common schema definition document, the BiM decoder can completely interpret the BiM generated by the BiM encoder. In other words, when the BiM encoder generates a BiM on the basis of a non-standard, original schema definition document and the BiM decoder has only a standard schema definition document, the BiM decoder can interpret only a standard part included in the BiM.

FIG. 7 shows an example of standard real time metadata described by XML before being encoded into a BiM by the BiM encoder. This standard real time metadata includes: a Wrapper including a standard name space identifier as a Root ("urn:schemas-proDisc:realTimeMeta" in this example) (first row), a UMID (second row), and a Filler for ECC alignment (third row); and a description corresponding to each frame. The description corresponding to each frame includes: essential items including a Bitfiller (fifth row) for byte alignment, an LTC (sixth row), a UMID (seventh row), and a KLV (eighth row); and a Filler (ninth row) for adjusting length of a fragment update unit (FUU) in the BiM.

The standard real time metadata before being encoded into the BiM is characterized by being provided with the Fillers for ECC alignment, byte alignment, and FUU length adjustment. The standard real time metadata is characterized especially in that the Bitfiller for byte alignment of a boundary of the essential items including the LTC, the UMID, and the KLV is provided in the encoded BiM.

Next, FIG. 8 shows an example of non-standard real time metadata described by XML before being encoded into a BiM by the BiM encoder, that is, extended real time metadata including original items (for example video camera setting/control information, ARIB metadata and the like) (hereinafter referred to as original items) added by a manufacturer in addition to standard items. This non-standard real time metadata includes: a Wrapper including a non-standard name space identifier as a Root ("urn:schemas-proDisc: realTimeMeta:cameraMeta" in this case) (first row), a UMID (second row), and a Filler for ECC alignment (third row); and a description corresponding to each frame.

The description corresponding to each frame includes: essential items including a Bitfiller (fifth row) for byte alignment corresponding to each frame, an LTC (sixth row), a UMID (seventh row), and a KLV (eighth row); original items (ninth to 17th rows) including video camera setting/control information; and a Filler (19th row) for adjusting length of a fragment update unit (FUU) in the BiM.

The non-standard real time metadata before being encoded into the BiM is also characterized by being provided with the Fillers for ECC alignment, byte alignment, and FUU length adjustment. The non-standard real time metadata is characterized especially in that the Bitfiller for byte alignment of a boundary of the essential items including the LTC, the UMID, and the KLV is provided in the encoded BiM.

Incidentally, non-standard real time metadata describing ARIB metadata or the like as an original item is also described in the same manner as in FIG. 8.

Figure 9:
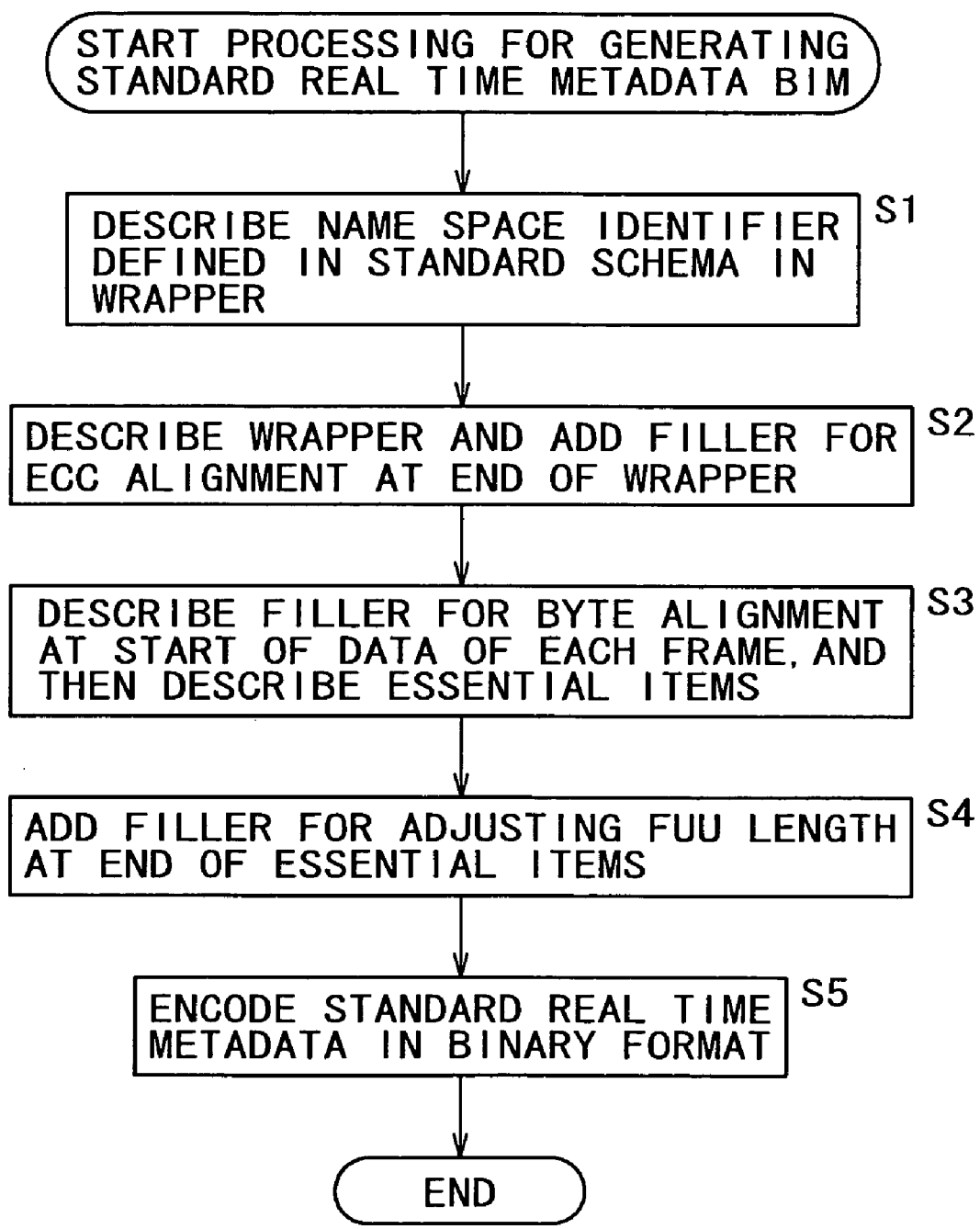
FIG. 9 is a flowchart of assistance in explaining processing for describing standard real time metadata before being encoded into a BiM.

Processing for generating the BiM of standard real time metadata as shown in FIG. 7 will next be described with reference to a flowchart of FIG. 9. In step S1, the clip data editing unit 54 describes in a Wrapper a name space identifier ("urn:schemas-proDisc:realTimeMeta" in this example) defined in a standard schema. In step S2, the clip data editing unit 54 describes a UMID and a Filler for ECC alignment. In step S3, the clip data editing unit 54 describes a Bitfiller for byte alignment at a start of data corresponding to each frame, and then describes essential items including an LTC, a UMID, and a KLV. In step S4, the clip data editing unit 54 adds, at an end of the essential items, a Filler for adjusting length of a fragment update unit in the BiM, and thereby describes standard real time metadata. In step S5, the clip data editing unit 54 compression-codes the standard real time metadata in a binary format by the BiM encoder included in the clip data editing unit 54, and thereby generates a standard BiM.

Figure 10:
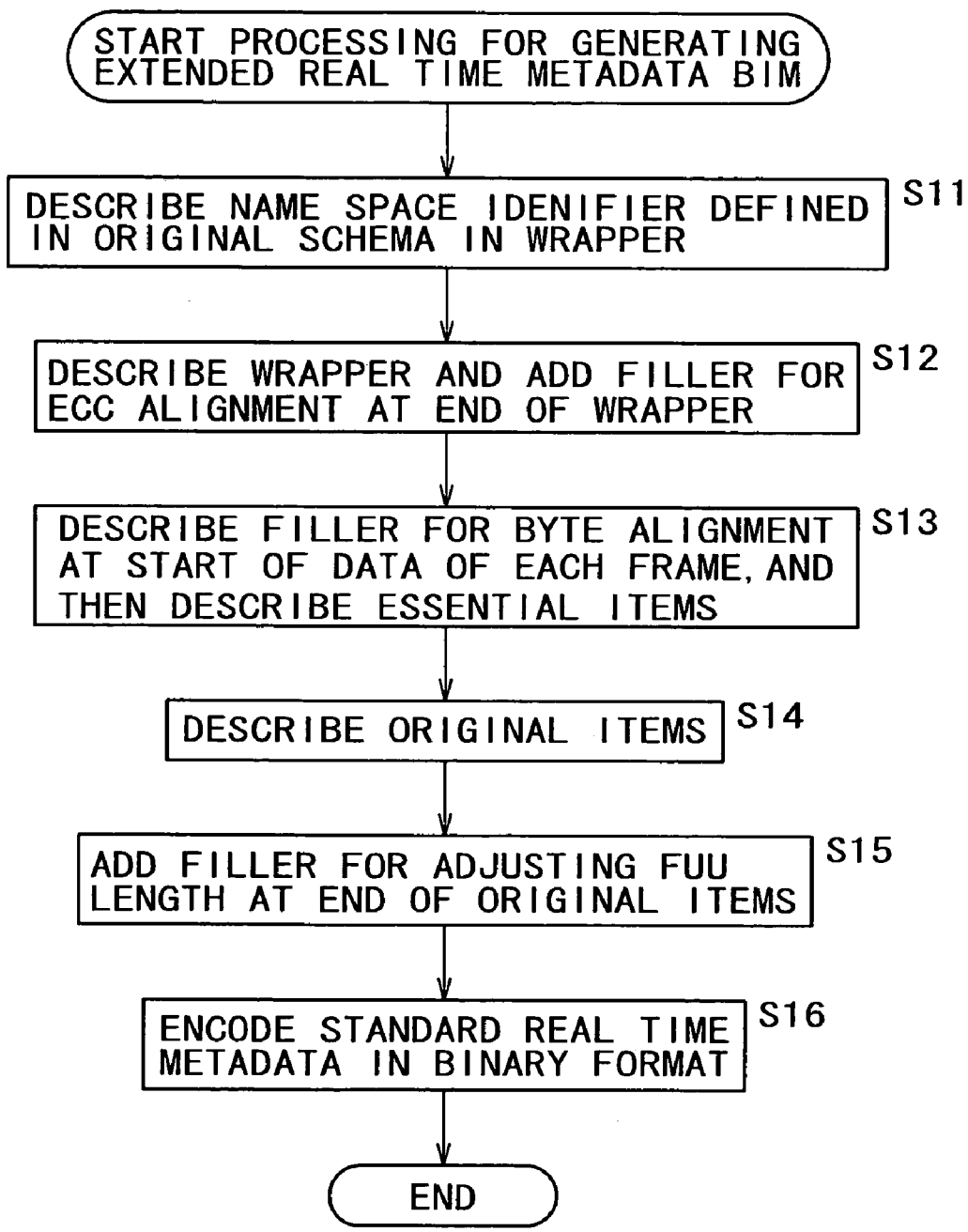
FIG. 10 is a flowchart of assistance in explaining processing for describing non-standard real time metadata before being encoded into a BiM.
Figure 11:
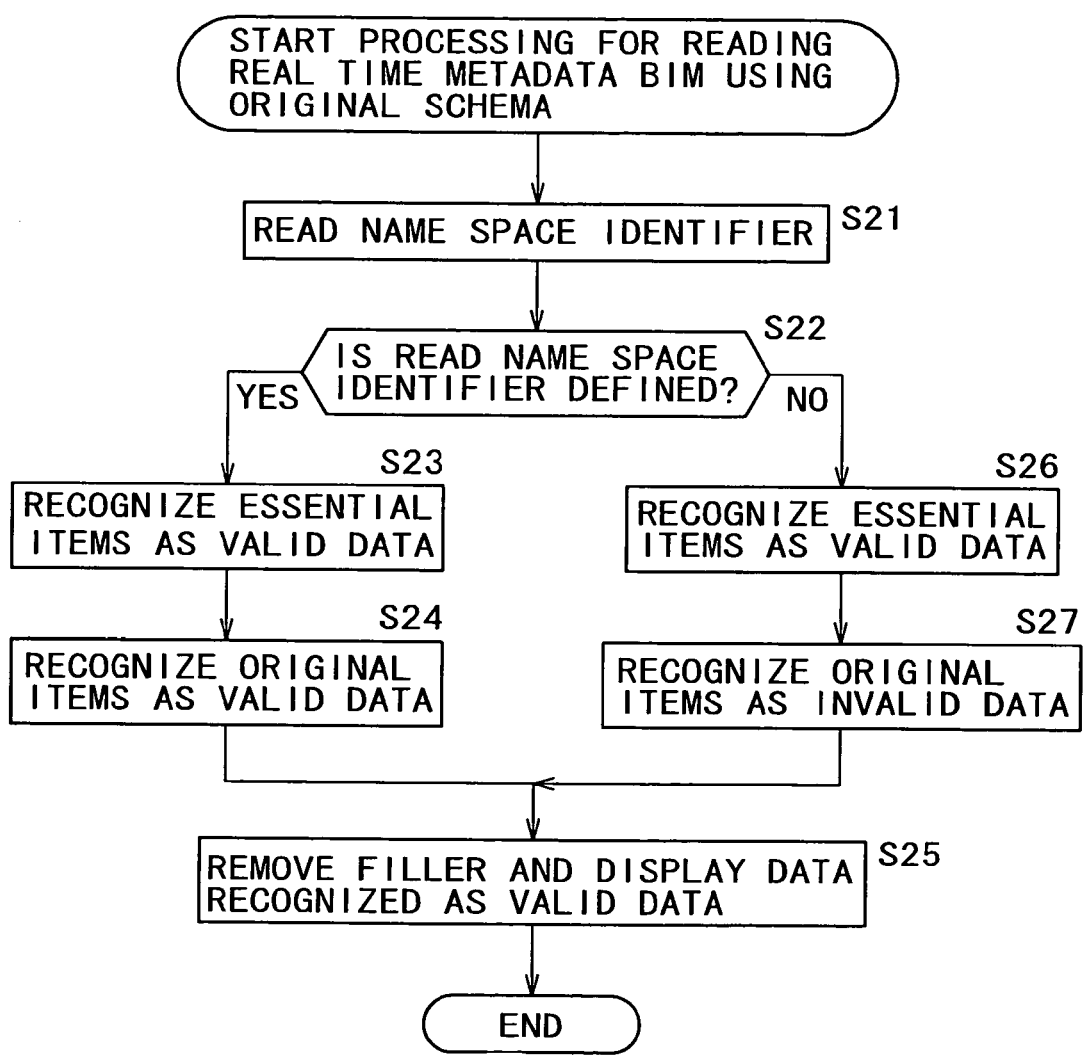
FIG. 11 is a flowchart of assistance in explaining processing for reading a BiM using an original schema.

Processing for generating the BiM of non-standard real time metadata as shown in FIG. 8 will next be described with reference to a flowchart of FIG. 10. In step S11, the clip data editing unit 54 describes in a Wrapper a name space identifier ("urn:schemas-proDisc:realTimeMeta:cameraMeta" in this example) defined in advance in a non-standard, original schema of a manufacturer. In step S12, the clip data editing unit 54 describes a UMID and a Filler for ECC alignment. In step S13, the clip data editing unit 54 describes a Bitfiller for byte alignment at a start of data corresponding to each frame, and then describes essential items including an LTC, a UMID, and a KLV. In step S14, the clip data editing unit 54 describes original items (video camera setting/control information in this case). In step S15, the clip data editing unit 54 adds, at an end of the essential items, a Filler for adjusting length of a fragment update unit in the BiM, and thereby describes non-standard real time metadata. In step S16, the clip data editing unit 54 compression-codes the non-standard real time metadata in a binary format by the BiM encoder included in the clip data editing unit 54, and thereby generates a non-standard BiM.

As described above, when real time metadata is encoded in a binary format and thereby a BiM is generated, byte alignment is performed at a boundary of essential items including an LTC, a UMID, and a KLV in the BiM. It is therefore possible to quickly find a position where the essential items are described when reading the thus formed BiM. It is thus possible to reduce time required to read the BiM and reduce an amount of resources to be used as compared with a case where byte alignment is not performed at the boundary of the essential items.

Incidentally, while the method of first describing real time metadata using XML and then converting the real time metadata to a binary format using the BiM encoder has been described above, the description using XML may be omitted to output BiM data directly by obtaining a binary format based on a schema in advance.

Description will next be made of processing for reading a BiM of real time metadata simultaneously with reproduction of clip data, for example. In step S21, the clip data editing unit 54 reads a name space identifier described in a Wrapper of the BiM using the BiM decoder included in the clip data editing unit 54. In step S22, the clip data editing unit 54 determines whether or not the read name space identifier is defined in a schema possessed by the clip data editing unit 54. When the clip data editing unit 54 determines that the read name space identifier is defined in the schema possessed by the clip data editing unit 54, the processing proceeds to step S23.

In step S23, the clip data editing unit 54 recognizes essential items included in the BiM as valid data. Further, in step S24, the clip data editing unit 54 recognizes original items included in the BiM as valid data. In step S25, the clip data editing unit 54 removes a Filler from the BiM, and thereafter uses the data recognized as valid (data of the essential items and the original items in this case) for edit processing and the like. Thereby the data recognized as valid is displayed on a screen, for example.

On the other hand, when the read name space identifier is for example "urn:schemas-proDisc:realTimeMeta:cameraMeta" and the schema possessed by the clip data editing unit 54 is a standard schema, the clip data editing unit 54 determines in step S22 that the read name space identifier is not defined in the schema possessed by the clip data editing unit 54, and then the processing proceeds to step S26.

In step S26, the clip data editing unit 54 recognizes the essential items included in the BiM as valid data. In step S27, the clip data editing unit 54 recognizes the original items as invalid data, that is, data unrecognizable by the clip data editing unit 54 (specifically, the clip data editing unit 54 recognizes the original items as a Filler having no substantial meaning). In step S25, the clip data editing unit 54 removes a Filler from the BiM, and thereafter uses the data recognized as valid (only data of the essential items in this case) for edit processing and the like. Thereby only the data recognized as valid is displayed on the screen, for example. At this time, the data of the original items is recognized as invalid data (that is, a Filler) and is thus not displayed on the screen. In this case, presence of the data of the original items of a manufacturer is not recognized by apparatus made by other manufacturers. It is therefore possible to enhance secrecy of the original items and prevent analysis and the like of the data of the original items.

Conversely, however, a certain character string (for example a string of zeros) may be displayed to make known the presence of the data of the original items recognized as invalid.

Incidentally, when real time metadata not encoded into a BiM is read simultaneously with reproduction of clip data, for example, similar processing can also be performed to read only data recognizable by the clip data editing unit 54 and not to read data unrecognizable by the clip data editing unit 54. In the present situation, however, real time metadata not encoded into BiM does not exist.

Further, while the method of processing real time metadata using a BiM decoder has been described above, essential items may be read directly without using a BiM decoder by designing a schema such that for example a byte offset of essential items in BiM technical data from a specified position is fixed regardless of whether or not the schema is a standard schema or a non-standard schema.

Description will next be made of handling of non-real time metadata by the clip data editing unit 54. As described above, a conversion table 92, a UMID, GPS information, or other information is described by using XML in clip metadata 91, which is a kind of non-real time metadata.

As with the above-described real time metadata, non-real time metadata can include original data of a manufacturer in addition to essential item data recorded as standard data. It is described in a name space defined in advance in an original schema of the manufacturer.

Figure 12:
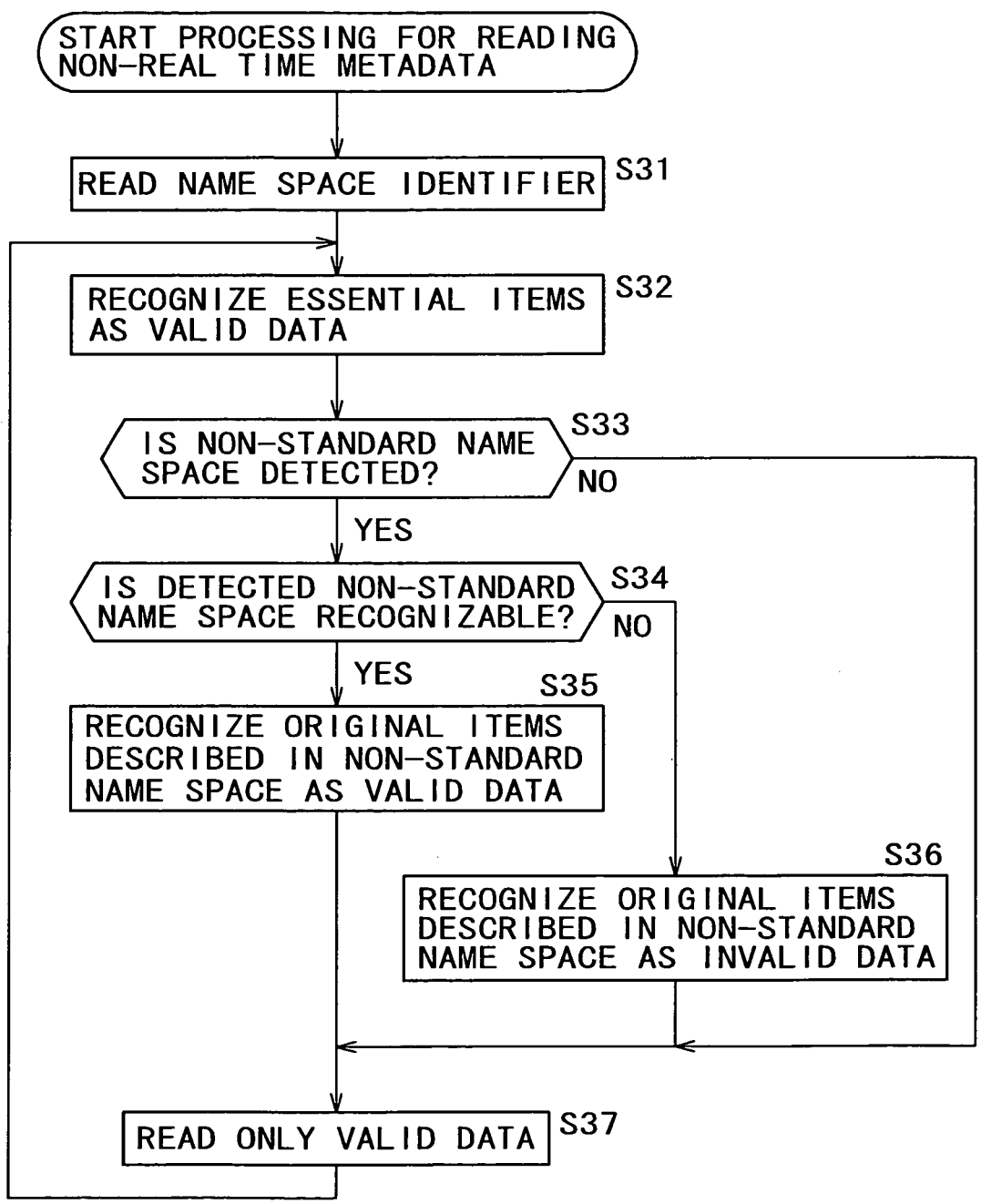
FIG. 12 is a flowchart of assistance in explaining processing for reading non-real time metadata including original items.

Processing for reading non-real time metadata including original items for use in clip data edit processing and the like will next be described with reference to a flowchart of FIG. 12.

In step S31, the clip data editing unit 54 reads a name space identifier of non-real time metadata. In step S32, the clip data editing unit 54 recognizes essential items described in a standard name space and included in the non-real time metadata as valid data.

In step S33, the clip data editing unit 54 determines whether or not a non-standard name space (that is, a non-standard name space original to a manufacturer) is detected. When the clip data editing unit 54 determines that a non-standard name space is detected, the clip data editing unit 54 determines in step S34 whether or not the detected non-standard name space is recognizable. When the clip data editing unit 54 determines that the detected non-standard name space is recognizable, the processing proceeds to step S35. In step S35, the clip data editing unit 54 recognizes original items described in the non-standard name space as valid data.

On the other hand, when the clip data editing unit 54 determines in step S34 that the detected non-standard name space is not recognizable, the processing proceeds to step S36. In step S36, the clip data editing unit 54 recognizes the original items described in the non-standard name space as invalid data.

In step S37, the clip data editing unit 54 reads the data recognized as valid and skips reading the data recognized as invalid. The read data is used for clip data edit processing. The processing thereafter returns to step S32 to repeat processing from step S32 on down.

Incidentally, when the clip data editing unit 54 determines in step S33 that a non-standard name space is not detected, processing in steps S34 to S36 is skipped to proceed to step S37.

As described above, when non-real time metadata is read for a purpose of clip data edit processing, for example, only original item data defined in a schema and comprehended by the clip data editing unit 54 is read, and original item data of another manufacturer, for example, which data is not defined in the schema is ignored without being read. It is therefore possible to use the read non-real time metadata efficiently.

Processing for editing non-real time metadata itself including original items, and then rerecording the non-real time metadata onto the optical disk 17 or transferring the non-real time metadata to another apparatus will next be described with reference to a flowchart of FIG. 13.

In step S41, the clip data editing unit 54 reads a name space identifier for the original items of the non-real time metadata. In step S42, the clip data editing unit 54 determines whether or not the read name space identifier is defined in a schema possessed by the clip data editing unit 54. When the clip data editing unit 54 determines that the read name space identifier is defined in the schema possessed by the clip data editing unit 54, the processing proceeds to step S43.

In step S43, the clip data editing unit 54 recognizes essential items included in the non-real time metadata as valid data. Further, in step S44, the clip data editing unit 54 recognizes the original items included in the non-real time metadata as valid data. In step S45, the clip data editing unit 54 reads the data recognized as valid (data of both the essential items and the original items in this case) and data recognized as invalid. In step S46, the clip data editing unit 54 edits only the read data recognized as valid as appropriate in such a manner as to correspond to user operation, for example. Incidentally, the processing in step S46 may be omitted.

In step S47, the clip data editing unit 54 rerecords the data recognized as valid which data is edited as appropriate and the data recognized as invalid which data is read in step S45 onto the optical disk 17 or transfers the data recognized as valid and the data recognized as invalid to another apparatus without destroying the data recognized as invalid.

On the other hand, when the clip data editing unit 54 determines in step S42 that the read name space identifier is not defined in the schema possessed by the clip data editing unit 54, the processing proceeds to step S48. In step S48, the clip data editing unit 54 recognizes the essential items included in the non-real time metadata as valid data. In step S49, the clip data editing unit 54 recognizes the original items included in the non-real time metadata as invalid data. In step S45, the clip data editing unit 54 reads the data recognized as valid (data of the essential items in this case) and the data recognized as invalid (data of the original items in this case). Then, processing after step S45 is performed in the same manner as described above.

As described above, when non-real time metadata itself is edited, for example, data of original items of another manufacturer, for example, not defined in the schema is not edited. When the non-real time metadata is further rerecorded or transferred, the data of original items of the other manufacturer, for example, not defined in the schema is rerecorded or transferred together with data of essential items and data of original items defined in the schema and thus comprehended. It is therefore possible to protect even the original item data not comprehended by the clip data editing unit 54 without deleting or changing the information.

It is to be noted that while the above description has been made of a case where data such as image data, audio data, low resolution data, frame metadata, clip metadata, edit lists and the like is recorded on an optical disk, a recording medium for recording these pieces of data is not limited to the optical disk. For example, the recording medium may be a magnetic disk such as a flexible disk or a hard disk, a magnetic tape, or a semiconductor memory such as a flash memory.

In addition, while a case where the editing terminal apparatus 16 performs editing has been described above, the information processing apparatus for performing the editing is not limited to the editing terminal apparatus 16. For example, the information processing apparatus may be the planning terminal apparatus 11, the image pickup device 14, or the field PC 15 in FIG. 1, or may be an information processing apparatus other than the above.

The series of processes described above can be carried out not only by hardware but also by software as described above. When the series of processes is to be carried out by software, a program including the software is installed from a recording medium or the like onto a computer incorporated in special hardware, or for example a general-purpose personal computer that can execute various functions by installing various programs thereon.

As shown in FIG. 2, the recording medium is not only formed by the removable medium 71 distributed to users to provide the program separately from the editing terminal apparatus 16, the removable medium 71 including a packaged medium including a magnetic disk (including flexible disks), an optical disk (including CD-ROMs, DVDs, magneto-optical disks, and MDs), a semiconductor memory or the like which has the program recorded thereon, but also formed by the ROM 52, the hard disk including the storage unit 63, or the like which has the program stored thereon and is provided to the user in a state of being preincorporated in the computer.

It is to be noted that in the present specification, the steps describing the program provided by the medium include not only processing carried out in time series in the described order but also processing carried out in parallel or individually and not necessarily in time series.

Also, in the present specification, a system refers to an apparatus as a whole formed by a plurality of apparatus.

What is claimed is:

1. An information processing apparatus for reproducing metadata including information on material data, said information processing apparatus comprising:
   determining means for determining whether or not said metadata inputted is defined in advance; and
   reproducing means for reproducing on a recording medium standard item data and non-standard item data included in said metadata when said determining means determines that said metadata is defined in advance, and reproducing only the standard item data included in said metadata when said determining means determines that said metadata is not defined in advance;
   recognizing means for recognizing the non-standard item data as invalid data being filler data having no substantial meaning;
   removing means for removing the filler data; and
   displaying means for displaying only the data recognized as valid data.

2. An information processing apparatus as claimed in claim 1, wherein said metadata is described using one of XML (extensible Markup Language) and BiM, which is a binary format of XML.

3. An information processing apparatus as claimed in claim 1, wherein said determining means determines whether or not said metadata is defined in advance on a basis of whether or not a name space identifier described in said metadata is defined in a schema possessed by said information processing apparatus.

4. An information processing apparatus as claimed in claim 1, wherein said metadata is real time metadata to be read simultaneously with reproduction of said material data.

5. An information processing method for reproducing metadata including information on material data, said information processing method comprising:
   a determining step for determining whether or not said metadata inputted is defined in advance; and a reproducing step for reproducing on a recording medium standard item data and non-standard item data included in said metadata when it is determined by processing of said determining step that said metadata is defined in advance, and reproducing only the standard item data included in said metadata when it is determined by the processing of said determining step that said metadata is not defined in advance;

a recognizing step for recognizing the non-standard item data as invalid data being filler data having no substantial meaning;

a removing step for removing the filler data; and a displaying step for displaying only the data recognized as valid data.

6. A computer readable medium having recorded thereon a program for reproducing metadata including information on material data is recorded, said program comprising:

a determining step for determining whether or not said metadata inputted is defined in advance; and a reproducing step for reproducing standard item data and non-standard item data included in said metadata when it is determined by processing of said determining step that said metadata is defined in advance, and reproducing only the standard item data included in said metadata when it is determined by the processing of said determining step that said metadata is not defined in advance;

a recognizing step for recognizing the non-standard item data as invalid data being filler data having no substantial meaning;

a removing step for removing the filler data; and a displaying step for displaying only the data recognized as valid data.

* * * * *